United States Patent
Thompson

(10) Patent No.: US 11,733,544 B2
(45) Date of Patent: Aug. 22, 2023

(54) ORTHOKERATOLOGY LENS WITH DISPLACED SHAPING ZONE

(71) Applicant: Euclid Vision Corporation, Sterling, VA (US)

(72) Inventor: Vance M. Thompson, Sioux Falls, SD (US)

(73) Assignee: Euclid Vision Corporation, Sterling, VA (US)

( * ) Notice: Subject to any disclaimer, the term of this patent is extended or adjusted under 35 U.S.C. 154(b) by 204 days.

(21) Appl. No.: 17/326,517

(22) Filed: May 21, 2021

(65) Prior Publication Data

US 2022/0011599 A1    Jan. 13, 2022

Related U.S. Application Data

(63) Continuation of application No. 16/238,948, filed on Jan. 3, 2019, now Pat. No. 11,036,063, which is a continuation of application No. 15/598,384, filed on May 18, 2017, now Pat. No. 10,175,503, which is a continuation of application No. 14/644,860, filed on Mar. 11, 2015, now Pat. No. 9,709,822.

(51) Int. Cl.
*G02C 7/04* (2006.01)
*G02C 7/02* (2006.01)
*G02C 7/00* (2006.01)

(52) U.S. Cl.
CPC .............. *G02C 7/047* (2013.01); *G02C 7/00* (2013.01); *G02C 7/021* (2013.01); *G02C 7/04* (2013.01); *G02C 7/048* (2013.01)

(58) Field of Classification Search
CPC .......... G02C 7/047; G02C 7/00; G02C 7/021; G02C 7/04; G02C 7/048

USPC .................................................... 351/159.23
See application file for complete search history.

(56) References Cited

U.S. PATENT DOCUMENTS

| | | |
|---|---|---|
| 5,191,365 A | 3/1993 | Stoyan |
| 5,422,687 A | 6/1995 | Tanaka et al. |
| 5,880,809 A | 3/1999 | Lieberman et al. |
| 5,953,098 A | 9/1999 | Lieberman |

(Continued)

FOREIGN PATENT DOCUMENTS

| | | |
|---|---|---|
| JP | 2007-195818 | 8/2007 |
| WO | 97/34185 | 9/1997 |

OTHER PUBLICATIONS

PCT International Search Report for International Application No. PCT/US2016/017805, dated May 11, 2016.

(Continued)

*Primary Examiner* — William R Alexander
(74) *Attorney, Agent, or Firm* — Sunit Talapatra; Foley & Lardner LLP

(57) ABSTRACT

A contact lens for application in practice of orthokeratology on an eye, including a curved shell having a concave surface and a convex surface. The concave surface includes a carrier zone and a back shaping zone, the back shaping zone having a first curvature and the carrier zone having at least one second curvature. The curved shell has a geometric center and the back shaping zone has a shaping zone center and the back shaping zone center is offset peripherally from the geometric center. The curved shell can have an overall diameter that approximates a corneal limbal diameter of the eye to which the contact lens is to be applied.

12 Claims, 7 Drawing Sheets

(56) References Cited

U.S. PATENT DOCUMENTS

| | | | |
|---|---|---|---|
| 5,963,297 | A | 10/1999 | Reim |
| 6,199,982 | B1 | 3/2001 | Oyama |
| 6,241,355 | B1 | 6/2001 | Barsky |
| 6,361,169 | B1 | 3/2002 | Tung |
| 6,543,897 | B1 | 4/2003 | Tung |
| 6,582,077 | B1 | 6/2003 | Tabb et al. |
| 6,896,368 | B2 | 5/2005 | Baugh |
| 8,192,020 | B2 | 6/2012 | Goto et al. |
| 2002/0003605 | A1 | 1/2002 | Rogers et al. |
| 2002/0159025 | A1 | 10/2002 | Legerton et al. |
| 2005/0213030 | A1 | 9/2005 | Meyers |
| 2007/0122450 | A1 | 5/2007 | Sancho |
| 2008/0212021 | A1 | 9/2008 | Berke |
| 2009/0141235 | A1 | 6/2009 | Collins et al. |
| 2009/0303433 | A1 | 12/2009 | Shimojo |
| 2009/0303442 | A1 | 12/2009 | Choo et al. |
| 2010/0069857 | A1 | 3/2010 | Christensen |
| 2010/0073635 | A1* | 3/2010 | Legerton ............... G02C 7/047 351/247 |
| 2010/0171924 | A1 | 7/2010 | Perrin |
| 2010/0296050 | A1 | 11/2010 | Goto et al. |
| 2011/0285958 | A1 | 11/2011 | Berke |
| 2012/0105804 | A1 | 5/2012 | Legerton |
| 2012/0188502 | A1 | 7/2012 | Abderhalden |
| 2012/0242952 | A1 | 9/2012 | Nakajima et al. |
| 2013/0182215 | A1 | 7/2013 | Tung |
| 2013/0182216 | A1 | 7/2013 | Ho et al. |
| 2014/0043588 | A1 | 2/2014 | Grant et al. |
| 2015/0219926 | A1 | 8/2015 | Fujikado |

OTHER PUBLICATIONS

PCT International Preliminary Report on Patentability and Written Opinion for International Application No. PCT/US2016/017805, dated Sep. 12, 2017, 9 pages.

Application and File History for U.S. Appl. No. 14/644,860, filed Mar. 11, 2015. Inventor: Vance M. Thompson.

Application and File History for U.S. Appl. No. 15/598,384, filed May 18, 2017. Inventor: Vance M. Thompson.

PCT International Written Opinion in International Application No. PCT/US2016/017805, dated May 11, 2016, 8 pages.

Application and File History for U.S. Appl. No. 16/238,948, filed Jan. 3, 2019. Inventor: Vance M. Thompson.

* cited by examiner

ORTHOKERATOLOGY LENS WITH DISPLACED SHAPING ZONE

CROSS-REFERENCE TO RELATED APPLICATION

This application is a continuation of application Ser. No. 16/238,948, filed Jan. 3, 2019, now U.S. Pat. No. 11,036,063, which is a continuation of Application No. 15/598,384, filed May 18, 2017, now U.S. Pat. No. 10,175,503, entitled "Orthokeratology Lens with Displaced Shaping Zone", which is a continuation of application Ser. No. 14/644,860 filed Mar. 11, 2015, entitled "Orthokeratology Lens with Displaced Shaping Zone", now U.S. Pat. No. 9,709,822, issued Jul. 18, 2017, each of which is hereby fully incorporated herein by reference.

TECHNICAL FIELD

The invention generally relates to the field of contact lenses. More particularly, the invention relates to contact lenses that are applied to the eye in the practice of orthokeratology to temporarily reshape the anterior corneal surface.

BACKGROUND

Orthokeratology is the practice of applying rigid generally highly oxygen permeable contact lenses to the eye to reshape the anterior corneal surface, thus altering refractive error temporarily or possibly permanently. Orthokeratology is sometimes identified by other names such as corneal shaping contact lenses, overnight vision correction, overnight contact lenses to correct or control myopia, or corneal refractive therapy. Other identifiers beyond these may be utilized as well. Orthokeratology is used primarily in the treatment of myopia or myopia with astigmatism. However, orthokeratology has also been utilized, less commonly, in the refractive treatment of hyperopia or hyperopia with astigmatism.

Orthokeratology has existed in some form for many decades. Early, hard contact lenses were noted by many to temporarily alter the anterior corneal shape, thus, creating alterations in refractive error when the contact lenses were not on the eye. Early attempts to practice orthokeratology utilizing hard (PMMA or polymethyl methacrylate) contact lenses were hindered by poor technology and limited understanding of corneal physiology and the criteria necessary to predictably correct for myopia by corneal molding. Significant advances have been made in the practice of orthokeratology since the advent of corneal topography measuring instrumentation in approximately the last twenty years. The advent of computerized corneal topography has permitted the creation of contact lens designs for orthokeratology that provide better repeatability and predictability of results because the corneal topographer provides an increasingly accurate map of the surface curvature of the cornea.

Further improvements in orthokeratology occurred in recent years because rigid gas permeable contact lenses that provides a much higher oxygen permeability have demonstrated the possibility of wearing the orthokeratology lenses overnight rather than utilizing the contact lenses during the day. Further, the introduction of computer numerically controlled precision lathes and other manufacturing equipment have allowed lens designs for orthokeratology to be manufactured to higher accuracy than previously possible.

Orthokeratology has also been credited by some researchers with slowing or reducing progression of myopia in children. Results of research on this area have been mixed and the effectiveness of orthokeratology in limiting or slowing the progression of myopia is uncertain.

Because the cornea provides a large fraction of the eye's focusing power, and because of the high refractive power and steep curvature of the cornea, very small changes in the curvature of the cornea or corneal thickness can result in substantial changes in refractive error. Accordingly, in orthokeratology, specially shaped contact lenses are used to lightly press on or mold the cornea, causing the cornea to gradually change shape to correct refractive error. The corrective effect may last up to approximately 72 hours once the eye is initially adapted to the lenses. Accordingly, in a usual orthokeratology procedure, according to current practice, contact lenses are worn during sleep and removed during the day. The corneal molding effect after the lenses are removed provides a reduction or elimination of refractive error. Typically, the rigid high oxygen permeability contact lenses are worn for six to eight continuous hours during sleep. Sometimes soft contact lenses are worn during the day at least during the adaptation period for correction of residual refractive errors. Some patients experience a return of some refractive error in the evening for which the orthokeratology lenses or soft contact lenses may be worn to correct refractive error under these circumstances.

Improvements in the accuracy of corneal topography analysis have also provided additional information about the shape of the anterior cornea and has made it apparent that the optical center of the cornea does not always coincide with the visual axis or optical axis of the eye.

There is still room for improvement in the area of orthokeratology contact lenses.

SUMMARY

The invention disclosed and claimed in this application addresses a problem apparent in certain orthokeratology circumstances.

Example embodiments of the invention include a high oxygen permeability rigid gas permeable contact lens for orthokeratology that is sized to approximate the limbal diameter and that has a displaced molding zone as compared to the geometric center of the contact lens. According to embodiments of the invention, the displaced molding zone orthokeratology lens may include a curved shell having a concave surface and a convex surface. The concave surface includes at least a carrier zone and a molding zone. The molding zone is on the concave surface of the shell and has a first curvature and the carrier zone has at least one second curvature, possibly one or several additional curvatures.

According to an embodiment of the invention, the curved shell has a geometrical center centered on the perimeter of the circular lens and the molding zone has a molding zone center that is displaced from the geometrical center. As discussed above, the curved shell may have an overall diameter that approximates the corneal limbal diameter of the eye to which the contact lens is to be applied.

According to embodiments of the invention, the curved shell is structured to be stabilized in rotation relative to the eye to when the lens is worn on the eye during sleep.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
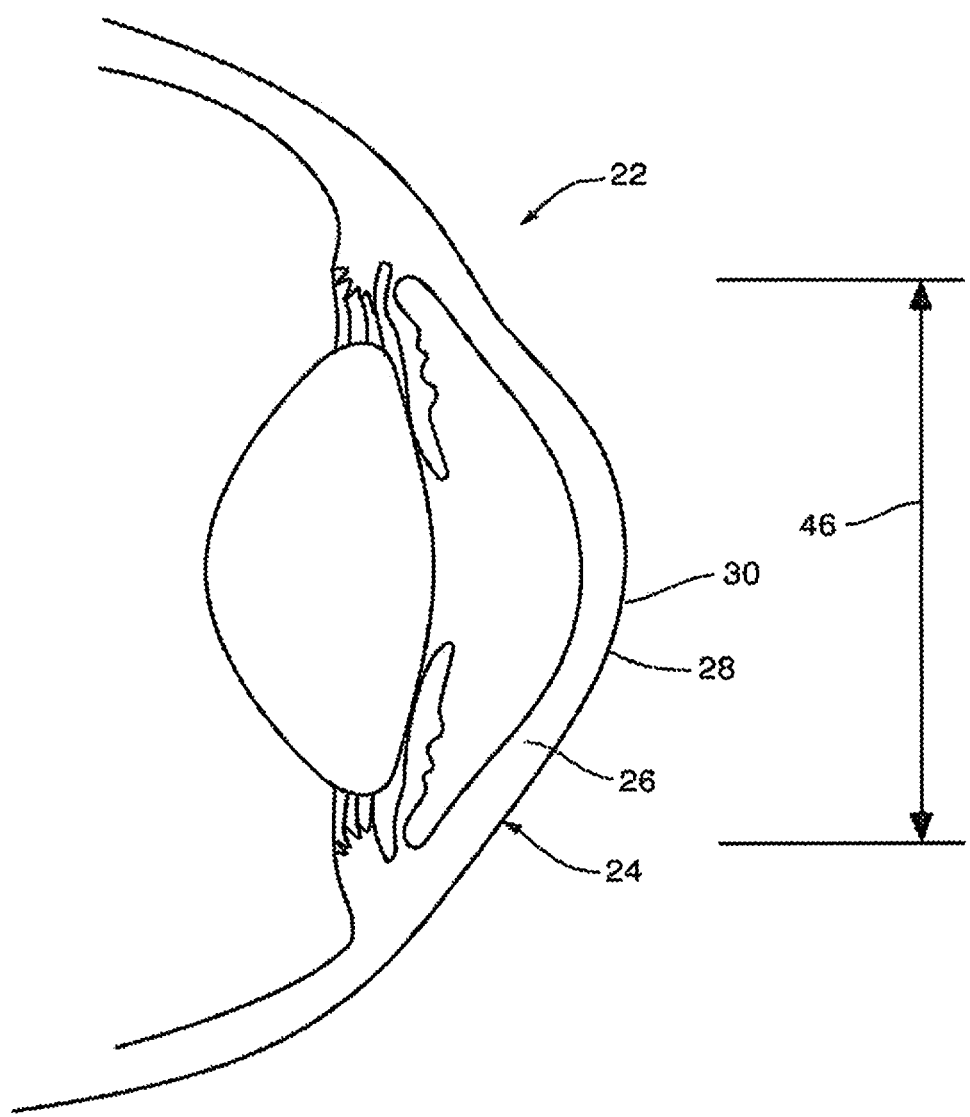
FIG. 1 is a cross-sectional view of the anterior segment of a human eye.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 2:
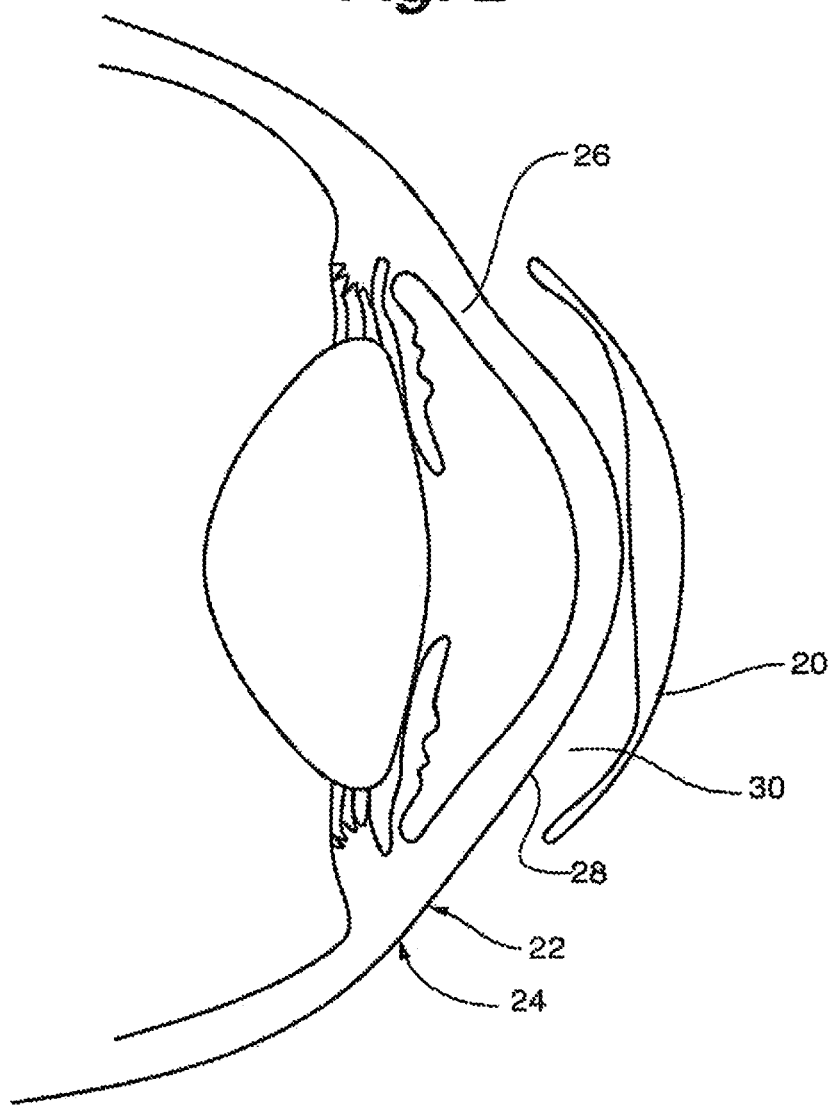
FIG. 2 is a cross-sectional view of the anterior segment of the human eye with a schematically depicted orthokeratology lens in place.
Figure 3:
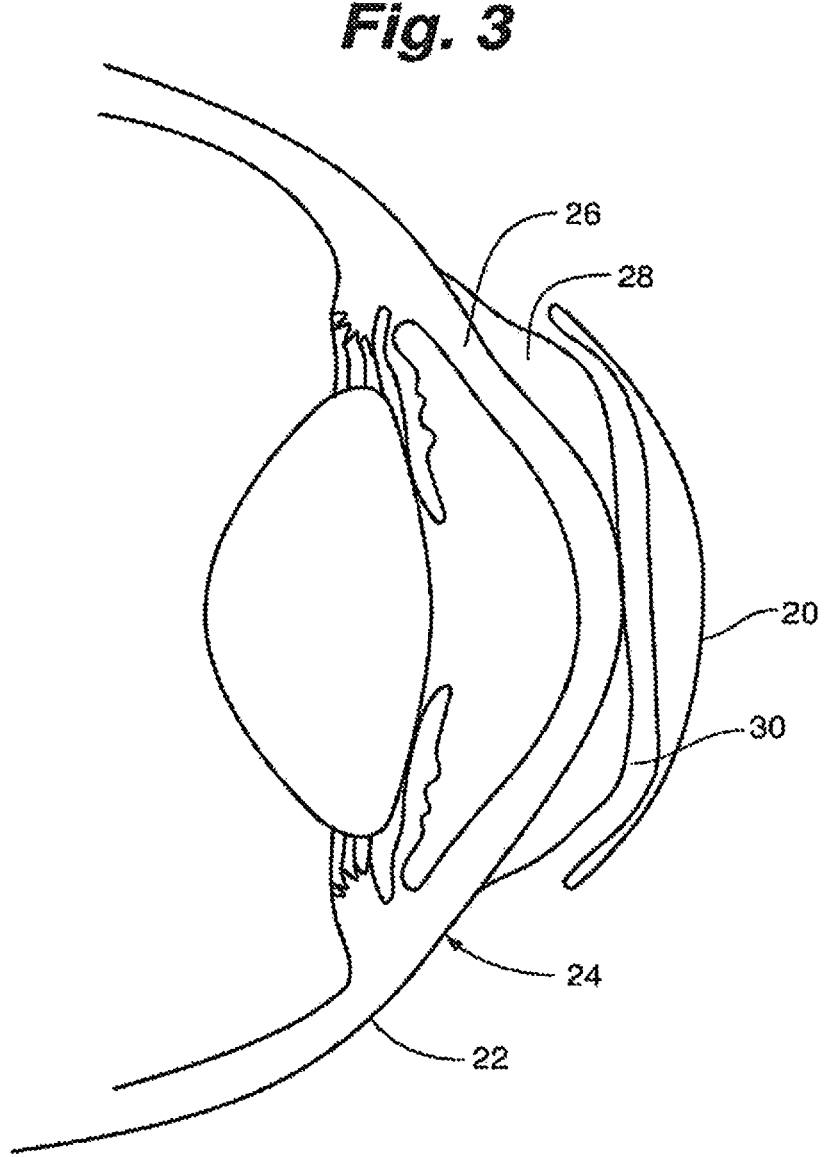
FIG. 3 is a cross-sectional view of the anterior segment of the human eye schematically depicting the effect of an orthokeratology lens on the shape and structure of the human cornea with corneal changes exaggerated for clarity.

Referring to FIGS. 1-3, orthokeratology lens 20 is schematically depicted along with eye 22. Eye 22 includes an anterior segment 24 which further includes cornea 26. Cornea 26 has multiple layers and a structure familiar to those skilled in the art. The eye's structure includes corneal epithelium 28. According to recent theories of the mechanism of action of orthokeratology, orthokeratology lens 20 provides a positive pressure on the tear film 30, centrally and a neutral or negative pressure peripherally. In the context of orthokeratology correction for myopia, this causes compression of central corneal epithelium 28 and reorganization of corneal epithelial cells such that the corneal epithelial cells are displaced more peripherally and less centrally, thus subtly reshaping the anterior corneal epithelium 28 surface resulting in a change in refractive error. In the context of hyperopia orthokeratology correction, pressure is applied to the corneal epithelium more peripherally and less centrally thus causing migration or remodeling of corneal epithelial cells to create a steepening rather than a flattening of the anterior cornea. Known orthokeratology lens designs include a molding or shaping zone that is located centered in the rigid oxygen permeable contact lens.

Figure 4:
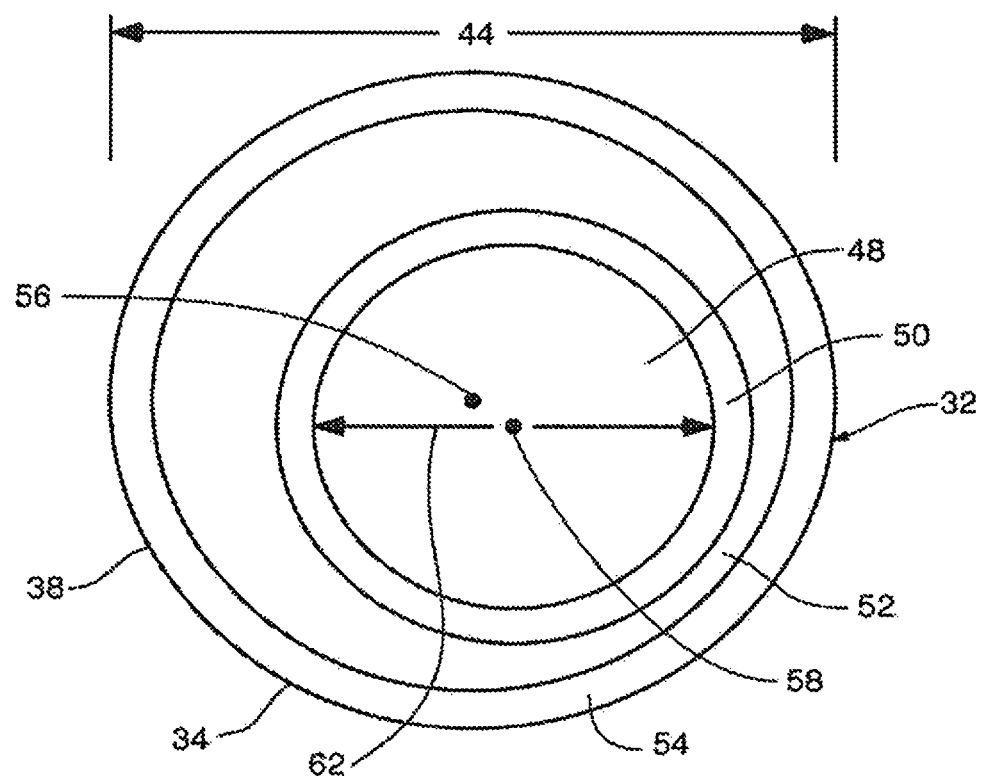
FIG. 4 is an anterior to posterior view of an orthokeratology lens according to an embodiment of the invention including a displaced molding or shaping zone.
Figure 7:
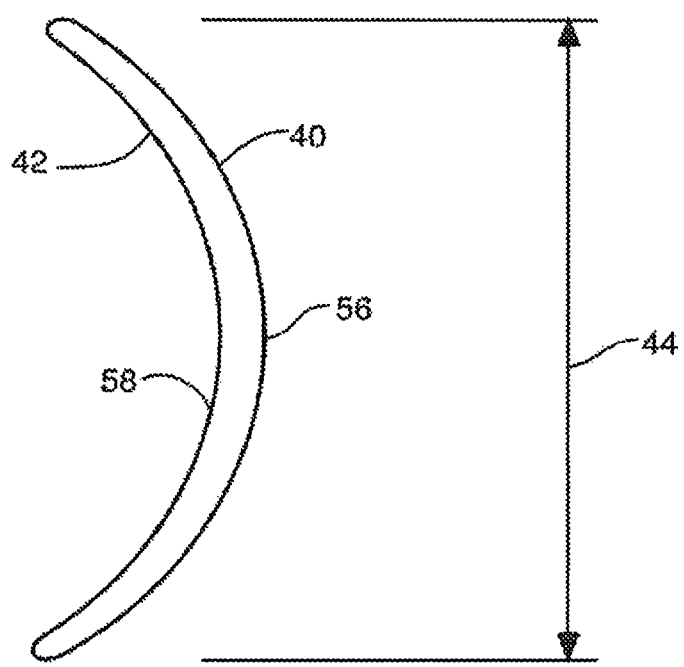
FIG. 7 is a cross sectional view of an orthokeratology lens according to an embodiment of the invention.

Referring now to FIGS. 4 and 7, displaced molding zone contact lens 32 according to an example embodiment of the invention is depicted. Displaced molding zone contact lens 32 is a generally unitary structure formed of rigid curved shell 34 forming lens body 36. Rigid curved shell 34 is formed, for example, from a high oxygen permeability gas permeable rigid contact lens material. According to an example embodiment of the invention, rigid curved shell 34 is intended for overnight wear and accordingly, is formed of an oxygen permeable material having an ISO/Fatt Dk of 85 or more. Rigid curved shell 34 is generally formed of a material approved for overnight wear by the U.S. Food and Drug Association. For example, rigid shell 34 may be formed of a siloxane-fluorocarbon polymer. Lens materials may also include other fluorocarbon polymers and any rigid oxygen permeable contact lens material now available and materials to become available in the future.

Lens body 36 is defined by peripheral edge 38, anterior convex surface 40 and posterior concave surface 42. Peripheral edge 38 defines overall diameter 44 of displaced molding zone contact lens 32. According to an example embodiment of the invention, overall diameter 44 approximates the limbal diameter 46 of cornea 26. Accordingly, overall diameter 44, according to an example embodiment, is approximately 11.5 mm but may range from approximately 10.5 mm to approximately 12.5 mm. These diameter values are examples and should not be considered limiting unless recited in the claims. Human cornea 26 is generally understood to have a horizontal diameter in a range of 10.76 mm to 12.60 mm and a vertical diameter in a range of about 10.6 mm to about 11.7 mm. Corneal diameter is commonly measured based on the so-called horizontal visible iris diameter (HVID) which is the measured width of the transparent cornea horizontally across the cornea from the white edge of the sclera temporally to the white edge of the sclera nasally. According to example embodiments of the invention, overall diameter 44 may range between approximately 10.5 mm and 13 mm.

Displaced molding zone of contact lens 32, according to an example embodiment of the invention, may be manufactured in a reverse geometry design. Reverse geometry designs include lenses of three zone and four zone designs. These terms are understood by those skilled in the orthokeratology arts.

According to an example embodiment of the invention, referring to FIGS. 4 and 7, rigid curved shell 34 of displaced molding zone contact lens 32 presents concave surface 42 back shaping zone 48, second curve 50, optional third curve 52 and fourth or peripheral curve 54. Rigid curved shell 34 presents geometric center 56. As can be seen in the depicted embodiment, shaping zone center 58 is displaced from geometric center 56 as is second curve 50.

Base curve 60 of back shaping zone 48 is generally formed to be 0.30 to 1.40 mm flatter than the flattest corneal curvature, also known as the flattest K. Back optic zone diameter 62 of back shaping zone 48 can be of any diameter but generally will fall within the range of 6.0 to 8.0 mm.

Second curve 50 also sometimes referred to as a reverse curve, generally has a width of 0.5 to 1.0 mm and is curved to be 0.5 to 1.0 mm steeper than base curve 60. This is the equivalent of approximately 3 to 5 diopters steeper than base curve 60. Optional third curve 52, if present, is also sometimes referred to as an alignment zone. Third curve 52, if present, according to an example embodiment of the invention is 1.0 to 1.5 mm wide.

Fourth or peripheral curve 54 is generally flatter than third curve 52 if present and flatter than second curve 50 in a three zone design. Fourth or peripheral curve 54 is generally structured to provide adequate edge lift and to aid in lens comfort, movement, tear and debris exchange.

In the embodiment depicted in FIG. 4, back shaping zone 48 and second curve 50 are both displaced as compared to geometric center 56. According to another embodiment of the invention, back shaping zone 48 is displaced relative to geometric center 56 while second curve 50 shares its center with geometric center 56.

Figure 5:
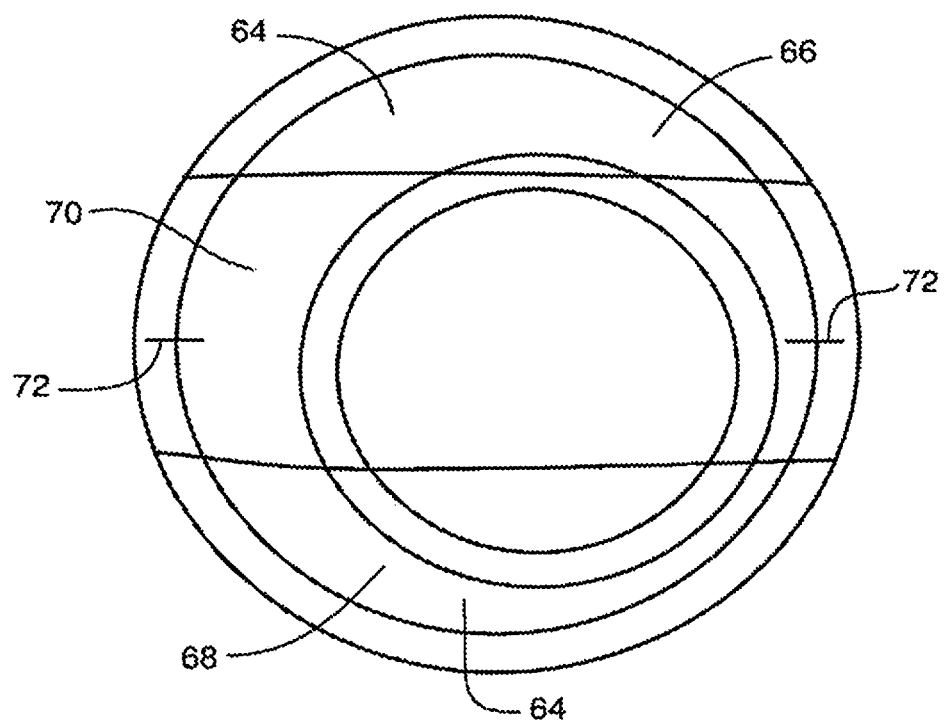
FIG. 5 is an anterior to posterior view of an orthokeratology lens according to an embodiment of the invention including orientation features of the lens.

Referring now particularly to FIG. 5, another embodiment of displaced molding zone contact lens 32 is depicted. Structures similar to those described above with relation to FIG. 4 are marked with similar reference numerals. In the depicted embodiment, stabilizing structures 64 include superior thin zone 66 and inferior thin zone 68. Superior thin zone 66 and inferior thin zone 68 are thinner than center zone 70. According to the depicted embodiment of the lens, orientation marker 72 is also present. Orientation marker 72 may be located inferiorly, nasally or temporally or superiorly so long as it marks a known orientation of displaced molding zone contact lens 32.

Figure 6:
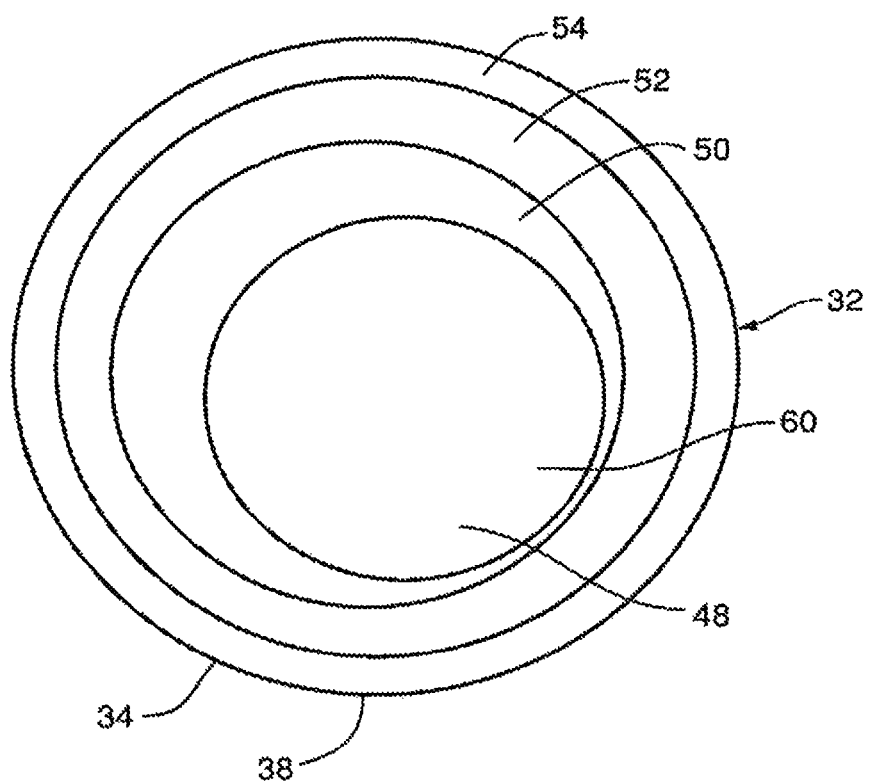
FIG. 6 is anterior to posterior view of an orthokeratology lens according to an embodiment of the invention including a displaced molding or shaping zone.

Referring now to FIG. 6, another embodiment of displaced molding zone contact lens 32 is depicted. In the depicted embodiment, rigid curved shell 34 of displaced molding zone contact lens 32 presents concave surface 42 back shaping zone 48, second curve 50, optional third curve 52 and fourth or peripheral curve 54. Rigid curved shell 34 presents geometric center 56. As can be seen in the depicted embodiment, shaping zone center 58 is displaced from geometric center 56 while second curve 50 is centered on geometric center 56.

Referring now to FIG. 7, a cross sectional view of displaced molding zone contact lens 32 is depicted. In this view, displaced molding zone contact lens 32 presents convex surface 40, concave surface 42, overall diameter 44, geometric center 56 and shaping zone center 58. For clarity, various other zones and curves are not depicted in FIG. 7.

In operation, Displaced molding zone contact lens 32 is placed on cornea 26 of eye 22. Displaced molding zone contact lens 32 is particularly useful for circumstances where the pupil or visual axis of the eye is demonstrated to be displaced from the geometric center of the cornea 26. Displaced molding zone contact lens 32 orients so that back shaping zone 48 is substantially centered on the pupil or visual axis of the eye when the pupil or visual axis is displaced. Accordingly, shaping zone center 58 generally coincides with the visual axis or pupil center of eye 22.

Displaced molding zone contact lens 32 is expected to orient relative the cornea to approximately center back shaping zone 48 on the pupil or visual axis of the eye when the pupil or visual axis is displaced based on alignment between the anterior corneal epithelium 28 and concave surface 42.

Stabilizing structure 64, if present, including superior thin zone 66 and inferior thin zone 68 are met with pressure from eyelids and thus are expected to tend to orient center zone 70 horizontally thus maintaining orientation and location of shaping zone center 58 substantially with the pupillary center or visual axis of eye 22.

If present, orientation marker 72 allows the contact lens wearer or practitioner to determine proper orientation of displaced molding zone contact lens 32 so that shaping zone center 58 substantially coincides with the desired location.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A contact lens for application in practice of orthokeratology on an anterior corneal surface of an eye, comprising:
   a curved shell having a concave surface and a convex surface, the concave surface including a carrier zone and a back shaping zone, the back shaping zone having a first spherical or toric curvature and the carrier zone having at least one second spherical or toric curvature different from the first spherical or toric curvature;
   the curved shell adapted to shape an anterior corneal surface by physical interaction between the back shaping zone and the anterior corneal surface whereby refractive error of the eye is temporarily or permanently reduced;
   the curved shell having a geometric center and the back shaping zone having a shaping zone center, the back shaping zone center being offset peripherally from the geometric center; and
   the curved shell defines structure that stabilizes rotation of the contact lens relative to the eye.

2. The contact lens as claimed in claim 1, wherein the at least one second spherical or toric curvature further comprises a second curve and the second curve is centered on the shaping zone center.

3. The contact lens as claimed in claim 1, wherein the at least one second spherical or toric curvature further comprises a second curve and the second curve is centered on the geometric center.

4. The contact lens as claimed in claim 1, wherein the contact lens is a reverse curve design.

5. The contact lens as claimed in claim 1, wherein the contact lens comprises a three curve design.

6. The contact lens as claimed in claim 1, wherein the contact lens comprises a four curve design.

7. The contact lens as claimed in claim 1, wherein the overall diameter approximates a corneal limbal diameter of the eye to which the contact lens is to be applied.

8. The contact lens as claimed in claim 1, wherein the overall diameter is in a range between 10.5 and 13.0 millimeters.

9. The contact lens as claimed in claim 1, wherein the overall diameter is in a range between 10.5 and 12.5 millimeters.

10. The contact lens as claimed in claim 1, wherein the overall diameter is in a range between 11.0 and 12.0 millimeters.

11. The contact lens as claimed in claim 1, further comprising an orientation marker thereon.

12. The contact lens as claimed in claim 1, wherein the structures that stabilize rotation of the contact lens relative the eye comprise a superior thin zone and an inferior thin zone.

* * * * *